Patented Dec. 21, 1943

2,337,191

UNITED STATES PATENT OFFICE 2,337,191

DEHYDROGENATION PROCESS

Bernard S. Greensfelder, Oakland, and Raymond C. Archibald, Berkeley, Calif., assignors to Shell Development Company, San Francisco, Calif., a corporation of Delaware No Drawing. Application December 7, 1942, Serial No. 468,328

11 Claims. (Cl. 260—668)

This invention relates to an improved process for the catalytic dehydrogenation of hydroaromatic hydrocarbons. More particularly, the invention relates to a process for the catalytic dehydrogenation of hydroaromatic hydrocarbons involving the use of special catalysts.

In copending application Serial No. 394,000, filed May 17, 1941, of which the present application is a continuation-in-part, there is described an improved process for the conversion of open chain aliphatic hydrocarbons to aromatic hydrocarbons by dehydrocyclization, which is characterized by the use of new and improved multi-component catalysts. The described catalysts comprise a cyclizing metal compound promoted with from about 2.5% to 20% of a rare earth and from 6% to 30% of an element selected from the group consisting of sodium plus potassium, potassium, rubidium, and cesium, said percentages being based upon the amount of metal in the active cyclization component of the catalyst. These catalysts are specifically active and selective for effecting dehydrocyclization. It is also stated in said copending application that any naphthenic hydrocarbons which may be present in the open chain hydrocarbon feed are simultaneously dehydrogenated.

It has now been found that, although the catalysts were designed primarily to effect dehydrocyclization, they are also much better than might be expected for the dehydrogenation of hydroaromatic hydrocarbons, and in such capacity they are superior to the various hitherto-proposed catalysts for the purpose. As will be more particularly pointed out, the use of these catalysts for the dehydrogenation of hydroaromatic hydrocarbons allows certain important advantages to be realized.

The catalysts employed in the process of the present invention are basically of the chromium oxide type; that is, they comprise chromium oxide as their major active constituent. The chromium oxide may be prepared in any of the conventional manners such as by precipitation, forming a chromium oxide gel, heat decomposition of ammonium chromate, chromium nitrate, chromium acetate, or the like. Very suitable catalysts contain the chromium oxide combined with one or more relatively inert materials such as alumina, boria, magnesia, zirconia, silica, etc. Thus, for example, the chromium oxide may be in the form of a mixed gel such, for example, as described in United States Patent 2,098,959. Such catalysts are in general much more stable than chromium oxide alone and have longer active lives. Very suitable catalysts contain a minor amount of chromium oxide supported upon a major amount of a relatively inert carrier. Although most of the large variety of common catalyst carriers may be employed, a very beneficial stabilizing effect is obtained with the carrier materials having adsorptive properties. Thus, for example, it is generally advantageous to employ one of the so-called activated carriers such as activated carbon, activated magnesia, activated zirconia, activated clays, and the like. Especially suitable carriers are those comprising activated or adsorptive aluminas such as, for instance, adsorptive alumina alpha monohydrate, and more especially adsorptive gamma alumina and the adsorptive zeta and beta aluminas described in copending applications Serial No. 463,306, Serial No. 434,630 and Serial No. 452,656, filed October 23, 1942, March 14, 1942 and July 28, 1942, respectively. Since, as will be pointed out, potassium is a somewhat better promoter than a mixture of sodium and potassium, it is generally advantageous but not essential to remove any appreciable concentrations of sodium salts from this carrier material, for instance, by washing with dilute acid prior to incorporating the chromium oxide. In these supported catalysts the amount of chromium oxide may vary within wide limits. In general, however, the catalysts comprise a major amount of the relatively inactive carrier or supporting material and a minor amount of chromium oxide. Very excellent catalysts, for example, contain between about 2% and 30% of chromium.

The chromium oxide may be incorporated in the supported catalyst in any one of several conventional manners. A convenient method comprises impregnating a suitable support with a solution of a suitable soluble chromium compound, drying, and subsequently converting the impregnated chromium compound to the oxide. If the applied chromium compound is chromium nitrate, chromium acetate, ammonium chromate, chromic acid or a similar compound, it may be converted to the oxide by simply heating.

The catalysts employed in the process of the invention contain, besides the chromium oxide, certain specific concentrations of two distinct types of promoters, namely, a rare earth and an element selected from the group consisting of sodium plus potassium, potassium, rubidium and cesium, which co-act to produce catalysts having a modified catalytic activity.

The rare earth elements comprise the separate and distinct group having atomic numbers between 57 and 72, i. e. comprising the elements between lanthanum and hafnium in the periodic system of the elements. Of these rare earth elements, cerium comes into first consideration in view of its availability. Other elements of the group, however, including lanthanum, praseodymium and neodymium, have been used and found to be suitable. The rare earth does not need to be pure but may be a mixture of rare earths. Thus, instead of employing a pure cerium compound, a compound of a mixture of rare earth elements may be employed. Such mixtures are obtained in processes for recovering the rare earths from monazite sands, samarskite and other rare earth minerals and are readily obtainable at reasonable cost. The rare earth or mixture of rare earths is probably present in the catalyst in the form of an oxide. In preparing the catalyst, however, other compounds capable of being converted to an oxide upon subsequent treatment may also be employed. Very suitable compounds are the oxygenated compounds such as the nitrates, acetates, oxalates, carbonates, hydroxides, and the like. The rare earth compounds may contain the rare earth in either a higher or lower valency state since they usually revert to a common state of oxidation under the conditions of use.

The cerium or other rare earth is employed in the catalyst in a concentration between about 2.5% and 20% based on the chromium in the catalyst. Thus, for instance, a supported chrome-alumina catalyst containing 10% chromium as chromium oxide is preferably impregnated with such an amount of cerium or other rare earth nitrate or other compound that the concentration of cerium or other rare earth is between about 0.25% and 2% based on the total catalyst.

Of the various available alkali metal compounds, which in conjunction with a rare earth promoter produce the desired promoting effect, those of potassium are preferred. Rubidium and cesium compounds are equally, if not more, effective but in view of their relatively high cost are of less technical importance. Sodium compounds are more or less inert but may exert a weak promoting effect or a weak depressing effect, depending upon the concentration. When present with a heavier alkali metal, however, concentrations of sodium up to about 15% by weight of the chromium may exert an additional promoting effect. Lithium compounds when used in conjunction with the rare earth promoter exert a decided depressing effect. Thus, it is seen that the alkali metal compounds, when used in conjunction with the rare earth promoters, fall into a definite series in the order of their atomic weights; lithium acts as a depressor; sodium acts either as a very weak depressor or a very weak promoter as a substitute for potassium, but exerts some additional promoting effect when present with potassium; potassium acts as a strong promoter; rubidium and cesium are even stronger promoters.

The alkali metal promoter may be applied to the catalyst in the form of the oxide, hydroxide, nitrate, nitrite, carbonate, acetate, cyanide, or the like. Of these, the nitrate is preferred.

The alkali metal promoter required in conjunction with the above specified concentrations of rare earth promoter to produce the desired promoting effect depends upon the amount of chromium in the catalyst and is quite critical. The alkali metal compound is employed in an amount affording a concentration of alkali metal between about 6% and 30%, and more preferably between about 6% and 20% of the chromium. Thus, for instance, in a catalyst comprising chromium oxide (10% Cr) incorporated in the surface of an alumina support and containing between about 0.25% and 2% of a rare earth metal, a compound of potassium such as the hydroxide, carbonate, nitrate or the like is incorporated to give a potassium content of between about 0.6% and 3%, and more preferably between about 0.6% and 2%, based on the total catalyst. If the concentration of alkali metal is either below or above this range of concentrations, the alkali metal acts as a depressor rather than a promoter.

The rare earth promoter and alkali metal promoter may be incorporated in the chromium oxide catalyst by any convenient method such, for instance, as by impregnation with solutions of suitable compounds of the promoters. The two types of promoters may be introduced into the catalyst simultaneously or by separate impregnation. When preparing the supported chromium oxide catalysts, it is advantageous to incorporate the promoters after impregnating the carrier material with the applied chromium compound and preferably prior to converting the applied chromium compound to the chromium oxide.

The prepared promoted catalyst may be in any form convenient for use in catalysis. Thus, it may be in the form of a finely divided powder suitable for use in "fluid catalyst" or "dust catalyst" systems of operation. When preparing the supported catalysts for such use a finely divided carrier is advantageously used as the base. It is possible, however, to prepare the catalyst in pieces of convenient size and subsequently reduce them to a powder of the desired degree of fineness. The catalysts may also be formed in pieces or fragments suitable for use in fixed bed operation by impregnating pieces or pellets of the carrier material of the desired size with the chromium oxide and the two classes of promoters. In the case of pelleted catalysts it is, however, sometimes advantageous to produce the catalyst in a finely divided state and subsequently pellet it, if desired, with a small amount of a pelleting lubricant and/or binder.

The catalysts prior to use may be advantageously heated for some hours at temperatures between about 300° C. and 600° C. in the presence of a gas such as hydrogen or natural gas. Such pretreatment usually improves their initial activity appreciably.

The preparation of a catalyst used in the process of the invention is illustrated in the following:

A weighed quantity of pellets of adsorptive gamma alumina is added at about room temperature to a chromic acid solution containing about 10% by weight of chromium based on the alumina and sufficient water so that the entire solution is adsorbed, leaving the alumina particles with a moist appearance; this ordinarily requires about 42 cc. of solution containing 21 gm. of $CrO_3$ per 100 gm. of alumina. This material is then dried as rapidly as possible at a relatively low temperature, preferably under about 110° C. The dried material is then added to the solution containing potassium nitrate in sufficient quantity to give a mol ratio of potassium to chromium of about 0.14 and cerium nitrate sufficient to give a concentration between about 0.5% and 1% and preferably about 0.7%, based on the dried catalyst. The quantity of solution used is preferably such that the entire solution is just adsorbed. The material is then again dried, preferably at a temperature below about 110° C., after which it may be immediately used. If it is desired to store the catalyst before use, it is desirable to calcine the catalyst at about 500° C. in order to prevent possible deterioration during storage due to slow hydration of the gamma alumina and the consequent change in crystal structure of the chromic acid. The catalyst, either with or without the calcining step, is introduced into the treater or reactor in which it is to be used, heated to a temperature of about 500° C., and treated for a short time, for instance, 10 minutes to 1 hour, with hydrogen. The catalyst is then brought to the reaction temperature and the hydroaromatic hydrocarbon to be dehydrogenated is introduced.

The advantageous results obtained in dehydrogenating hydroaromatic hydrocarbons with the above-described catalyst, according to the process of the invention, are illustrated in the following example:

Example

A cerium-potassium promoted chromium oxide-gamma alumina catalyst (.7% Ce, 1.2% K and 10% Cr) was prepared as described above and a standard type catalyst was prepared in the same manner with the same materials except that it was not promoted with the cerium and potassium. These two catalysts were used for the dehydrogenation of substantially pure methyl cyclohexane under the following conditions:

Temperature _____ °C__  490
Pressure _____ atm__   1
Liquid hourly space velocity _____  0.33
Contact time _____ seconds __ About 25

The mol per cents of toluene in the liquid product obtained with the two catalysts after various periods of processing are given in the following table:

| Processing time, hours | Mol percent toluene in the liquid product | |
|---|---|---|
| | Promoted catalyst | Unpromoted catalyst |
| 2 | 98 | 99 |
| 4 | 99 | 99 |
| 8 | 99 | 98 |
| 12 | 99 | 98 |
| 16 | 99 | 95 |
| 20 | 99 | 93 |
| 24 | 99 | 89 |

The process of the invention using the above-described catalysts is applicable to the dehydrogenation of hydroaromatic hydrocarbons, i. e. alicyclic hydrocarbons having a hexamethylene ring. Suitable hydrocarbons of this class are, for example, cyclohexane and its various homologues such as methyl cyclohexane, dimethyl cyclohexane, ethyl cyclohexane, methyl ethyl cyclohexane, etc. These hydrocarbons may be pure, in admixture, or in admixture with one or more various other hydrocarbon materials such as aromatic hydrocarbons, paraffin hydrocarbons and/or olefin hydrocarbons. Non-hydroaromatic naphthene hydrocarbons are, however, avoided as far as practical. A particularly advantageous application of the process is for the dehydrogenation of the hydroaromatic naphthene content in the various vaporizable naphthenic gasolines and fractions thereof such as many of the straight run fractions of naphthenic petroleums, cracked stocks, reformed stocks, oils produced in certain destructive hydrogenation processes, and the like. These various petroleum products from natural and/or synthetic origin often contain appreciable concentrations of non-hydroaromatic naphthene hydrocarbons. In such cases, it is advantageous though not essential to remove a substantial part of the non-hydroaromatic naphthene hydrocarbons prior to the dehydrogenation treatment as described in U. S. Patent 2,288,866.

The dehydrogenation is advantageously effected by contacting the vapors of the hydroaromatic naphthene hydrocarbon or mixture of hydrocarbons containing one or more hydroaromatic naphthene hydrocarbons with the described catalyst under dehydrogenating conditions. Dehydrogenating conditions for the conversion are much less severe than required for destructive hydrogenation and may be less severe than for the dehydrocyclization of paraffin hydrocarbons. The more important factors governing the severity of the dehydrogenating conditions are the temperature, pressure, space velocity (contact time), and the partial pressure of hydrogen present. Other factors such as the particular hydrocarbon or hydrocarbon mixture treated, the age of the catalyst, etc. also exert a small effect. These various factors are interdependent. Consequently, any given factor may be varied over a considerable range with suitable adjustment of the remaining factors. Applicable ranges of conditions with respect to the several more important factors are as follows:

Temperature _____ °C__  400 to 600
Pressure _____ atm. abs.__  0.1 to  20
Liquid hourly space velocity _____ 0.1 to   5
Mol ratio of added hydrogen to hydrocarbon feed _____  0 to 3:1

The ranges of conditions are not to be taken as rigidly fixed or absolutely limited, but only as indicative of bounds outside of which it is ordinarily unnecessary to go in carrying into effect the desired dehydrogenation. Furthermore, it is not to be assumed that all combinations of the stated factors within the stated ranges are equally advantageous. The best conditions within the specified ranges depend upon the mode of operation (i. e., fixed bed, moving bed, or fluid catalyst operation), the particular hydrocarbon feed employed, the age of the catalyst, etc. In no case are all of the conditions simultaneously made so severe that substantial destructive hydrogenation takes place. Although the process may be operated at atmospheric pressure, or even subatmospheric pressures, much better results are usually obtained when operating under moderate superatmospheric pressures, for instance, pressures above about 2 atmospheres absolute. One set of conditions, found to be nearly optimum for the dehydrogenaiton of methyl cyclohexane with a supported chrome-alumina catalyst (10% Cr) promoted with 0.7% Ce and 1.2% K, is, for example, as follows:

Temperature _____ °C__  490
Pressure _____ atm. abs__    5
Liquid hourly space velocity _____  0.7
Mol ratio of added hydrogen to hydrocarbon feed _____     0

One of the advantages of the process is that it may be operated in the absence of added or recycled hydrogen. In the hitherto-employed reforming of such hydrocarbon fractions with other catalysts, it is practically imperative that a considerable excess of hydrogen be present, for instance, a 2:1 to 10:1 mol ratio of hydrogen to hydrocarbon. This use of substantial amounts of added or recycled hydrogen greatly decreases the production capacity per catalytic converter and/or economy of operation. In the present process employing the above-described catalysts, it is found that, although added or recycled hydrogen may be employed, excellent results may be obtained without the addition or recycle of any hydrogen. This allows a very favorable space velocity, a higher production capacity, and/or a better economy of operation.

We claim as our invention:

1. A process for the catalytic dehydrogenation of hydroaromatic hydrocarbons wherein vapors of a hydroaromatic hydrocarbon are contacted under dehydrogenating conditions with a dehydrogenation catalyst, characterized in that said catalyst comprises chromium oxide and about 2.5% to 20% of a rare earth and 6% to 30% of an element selected from the group consisting of sodium plus potassium, potassium, rubidium, and cesium, said percentages being based upon the amount of chromium in the catalyst.

2. A process for the catalytic dehydrogenation of hydroaromatic hydrocarbons wherein vapors of a hydroaromatic hydrocarbon are contacted under dehydrogenating conditions with a dehydrogenation catalyst, characterized in that said catalyst comprises a major amount of an adsorptive carrier supporting a minor amount of chromium oxide and 2.5% to 20% of a rare earth and 6% to 30% of an element selected from the group consisting of sodium plus potassium, potassium, rubidium, and cesium, said percentages being based upon the amount of chromium in the catalyst.

3. Process according to claim 1 further characterized in that said carrier is an adsorptive alumina.

4. Process according to claim 1 further characterized in that said carrier is an adsorptive gamma alumina.

5. A process for the catalytic dehydrogenation of hydroaromatic hydrocarbons wherein vapors of a hydroaromatic hydrocarbon are contacted under dehydrogenating conditions with a dehydrogenation catalyst, characterized in that said catalyst comprises chromium oxide and 2.5% to 20% of a rare earth and 6% to 30% of potassium, said percentages being based upon the amount of chromium in the catalyst.

6. A process for the catalytic dehydrogenation of hydroaromatic hydrocarbons wherein vapors of a hydroaromatic hydrocarbon are contacted under dehydrogenating conditions with a dehydrogenation catalyst, characterized in that said catalyst comprises chromium oxide and 2.5% to 20% of cerium and 6% to 30% of an element selected from the group consisting of sodium plus potassium, potassium, rubidium, and cesium, said percentages being based upon the amount of chromium in the catalyst.

7. A process for the catalytic dehydrogenation of hydroaromatic hydrocarbons wherein vapors of a hydroaromatic hydrocarbon are contacted under dehydrogenating conditions with a dehydrogenation catalyst, characterized in that said catalyst comprises chromium oxide and 2.5% to 20% of cerium and 6% to 30% of potassium, said percentages being based upon the amount of chromium in the catalyst.

8. Process according to claim 6 further characterized in that the potassium is introduced into the catalyst in the form of potassium nitrate.

9. A process for the catalytic dehydrogenation of hydroaromatic hydrocarbons wherein vapors of a hydroaromatic hydrocarbon are contacted under dehydrogenating conditions with a dehydrogenation catalyst, characterized in that said catalyst comprises chromium oxide and about 2.5% to 20% of a rare earth and 6% to 30% of an element selected from the group consisting of sodium plus potassium, potassium, rubidium, and cesium, said percentages being based upon the amount of chromium in the catalyst, and in that said vapors are contacted with said catalyst in the absence of added hydrogen.

10. A process for the catalytic dehydrogenation of hydroaromatic hydrocarbons wherein vapors of a hydroaromatic hydrocarbon are contacted under dehydrogenating conditions with a dehydrogenation catalyst, characterized in that said catalyst comprises chromium oxide and about 2.5% to 20% of a rare earth and 6% to 30% of an element selected from the group consisting of sodium plus potassium, potassium, rubidium, and cesium, said percentages being based upon the amount of chromium in the catalyst, and in that said vapors are contacted with said catalyst under a pressure between about 2 and 10 atmospheres.

11. A process for the catalytic dehydrogenation of hydroaromatic hydrocarbons wherein vapors of a hydroaromatic hydrocarbon are contacted under dehydrogenating conditions with a dehydrogenation catalyst, characterized in that said catalyst comprises chromium oxide, between about 5% and 10% of a rare earth, and about 15% of an element selected from the group consisting of sodium plus potassium, potassium, rubidium, and cesium, said percentages being based upon the amount of chromium in the catalyst.

BERNARD S. GREENSFELDER.
RAYMOND C. ARCHIBOLD.